United States Patent
Nees

(10) Patent No.: US 7,559,589 B2
(45) Date of Patent: Jul. 14, 2009

(54) BUMPER BEAM CRUSH TOWER WITH CORNER IMPACT ATTRIBUTES

(75) Inventor: Rainer B. Nees, West Olive, MI (US)

(73) Assignee: Shape Corp., Grand Haven, MI (US)

( * ) Notice: Subject to any disclaimer, the term of this patent is extended or adjusted under 35 U.S.C. 154(b) by 0 days.

(21) Appl. No.: 11/842,450

(22) Filed: Aug. 21, 2007

(65) Prior Publication Data

US 2008/0042455 A1    Feb. 21, 2008

Related U.S. Application Data

(60) Provisional application No. 60/823,029, filed on Aug. 21, 2006.

(51) Int. Cl.
*B60R 19/34* (2006.01)
(52) U.S. Cl. .................... 293/154; 293/155
(58) Field of Classification Search .......... 293/154, 293/155
See application file for complete search history.

(56) References Cited

U.S. PATENT DOCUMENTS

| | | | |
|---|---|---|---|
| 3,847,428 A | 11/1974 | Uebelstadt | |
| 6,042,163 A | 3/2000 | Reiffer | |
| 6,174,009 B1 * | 1/2001 | McKeon | 293/133 |
| 6,318,775 B1 | 11/2001 | Heatherington et al. | |
| 6,595,502 B2 | 7/2003 | Koch et al. | |
| 6,644,699 B2 | 11/2003 | Anderson et al. | |
| 6,695,368 B1 | 2/2004 | Weykamp et al. | |
| 6,733,055 B2 | 5/2004 | Iino | |
| 6,886,873 B2 | 5/2005 | Weykamp et al. | |
| 6,932,398 B2 | 8/2005 | Frank | |
| 7,021,686 B2 | 4/2006 | Glasgow et al. | |
| 7,080,862 B2 | 7/2006 | Suzuki et al. | |
| 7,357,432 B2 * | 4/2008 | Roll et al. | 293/133 |
| 7,413,226 B2 * | 8/2008 | Muskos | 293/133 |
| 2002/0113447 A1 | 8/2002 | Frank | |
| 2005/0236850 A1 | 10/2005 | Evans et al. | |
| 2006/0186680 A1 | 8/2006 | Honda et al. | |

* cited by examiner

*Primary Examiner*—Dennis H Pedder
(74) *Attorney, Agent, or Firm*—Price, Heneveld, Cooper, DeWitt & Litton LLP

(57) ABSTRACT

A bumper system includes a tubular reinforcement beam and a pair of crush towers for mounting the beam to frame rails of a vehicle frame. The illustrated crush towers are formed from top and bottom stamped halves to form a pocket for receiving the ends of the beam, and further to form a crush tower for controlling impact energy communicated to the vehicle frame rails. Still further, the crush towers include an outboard portion forming a structural corner of the bumper system, the structural corner being constructed with crush initiators to provide optimal tuned corner impact characteristics. The combination of the beam 11 and towers 12 forms a bumper system taking advantage of roll forming (or extruding) of a rigid structural beam and a stamped mounting system.

8 Claims, 1 Drawing Sheet

US 7,559,589 B2

BUMPER BEAM CRUSH TOWER WITH CORNER IMPACT ATTRIBUTES

This application claims benefit under 35 U.S.C. § 119(e) of provisional application Ser. No. 60/823,029, filed Aug. 21, 2006, entitled BUMPER BEAM CRUSH TOWER WITH CORNER IMPACT ATTRIBUTES, the entire contents of which are incorporated herein in their entirety.

BACKGROUND

The present invention relates to crush towers for mounting bumper beams to vehicle frame rails, where the crush towers provide corner impact attributes.

Crush towers are often used to mount bumper beams to vehicle frame rails. The bumper beams are designed for high cross-car beam strength, such that they can withstand high impact loading on frontal impacts. The crush towers are provided to carry the bumper beams, but also to manage transmission of impact loads from the bumper beam into the vehicle frame. For example, the crush towers typically include crush initiators to reduce and/or control the transmission of spikes in impact energy being transmitted. It is desirable to provide a system that integrates crush towers and bumper beams, while decreasing the overall total number of components and while still maintaining design flexibility of the system.

Bumper beams are designed for corner impact as well as frontal impact. In fabricating a bumper beam for corner impact, the ends of the beam are often reformed/reshaped in secondary operations . . . or components are attached to the ends during secondary operations. However, secondary operations are expensive, time consuming, and require space and in-process inventory. Further, they tend to increase the overall total number of components and limit design flexibility of the system.

SUMMARY OF THE PRESENT INVENTION

In one aspect of the present invention, a bumper system includes a bumper beam and a pair of crush towers for mounting the beam to a vehicle. Each of the crush towers include a first portion for receiving an end of the beam, a second portion configured for mounting to a vehicle frame rail for carrying the bumper beam, and a third portion forming a surface extending from a face of the end of the bumper beam. The third portion is shaped to form a structural corner of the vehicle, and at least one of the first, second, and third portions including crush initiators for controlling impact energy.

In another aspect of the present invention, a bumper system includes a bumper beam and a pair of crush towers for mounting the beam to a vehicle. Each of the crush towers includes a first portion for receiving an end of the beam, a second portion configured for mounting to a vehicle frame rail for carrying the bumper beam, and a third portion forming a surface extending from a face of the end of the bumper, with the third portion also including a tow hook mount.

In another aspect of the present invention, a bumper system includes a bumper beam and a pair of crush towers for mounting the beam to a vehicle. The bumper beam has a continuous cross-sectional shape, and each crush tower includes a stamped top and bottom section that mate together to define a first portion for receiving an end of the beam and to define a second portion configured for mounting to a vehicle frame rail for carrying the bumper beam. The towers also include a third portion forming a surface extending from a face of the end of the bumper, the third portion being shaped to form a structural corner of the vehicle.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1:
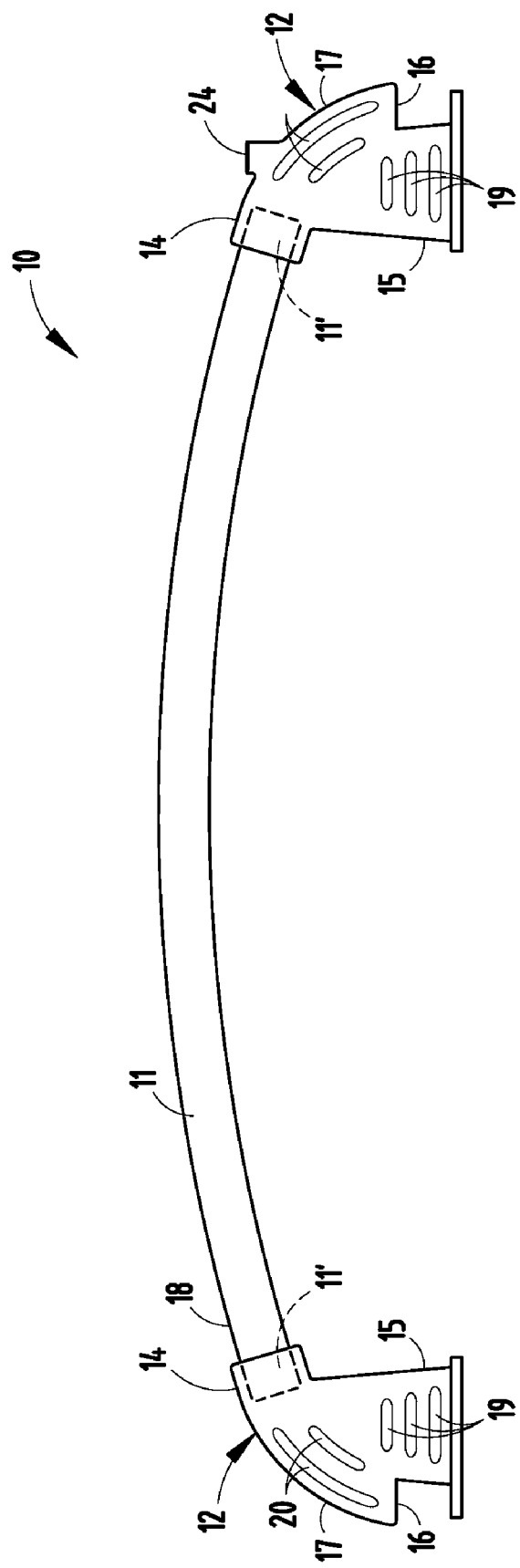
FIG. 1 is a top view of a bumper system embodying the present invention.

A bumper system 10 (FIG. 1) includes a reinforcement beam 11 and a pair of crush towers 12 for mounting the beam 11 to the frame rails of a vehicle frame, such as in a front or rear of a vehicle. The illustrated crush towers 12 are optimally constructed to matingly securely receive ends 11' of the beam 11 for stable support and in a manner minimizing secondary operations on the beam 11. The crush towers 12 are further optimally constructed to provide a mounting surface for mounting the beam and crush towers 12 to a vehicle, and to provide a controlled predictable collapse during frontal impact. Still further, the crush towers 12 include an outboard portion 16 forming a structural corner of the bumper system 10, and that is constructed with crush initiators to provide optimal tuned corner impact characteristics. The combination of the beam 11 and towers 12 forms a bumper system taking advantage of roll forming (or extruding) of a rigid structural beam and a stamped mounting system.

The illustrated beam 11 includes at least one tubular section. For example, it is contemplated that the beam 11 can be "D" shaped (i.e., one tube section) or "B" shaped (i.e., two tube sections spaced vertically). Nonetheless, the present inventive concepts could also be used on a beam that is not tubular. The illustrated beam 11 is roll formed. However, it is contemplated that the present inventive concepts could be used on a stamped or extruded beam, such as an extruded aluminum beam. The illustrated beam 11 is longitudinally swept to have an arcuate front surface defining a first radius matching an aerodynamic shape of the vehicle model for which it is intended.

The crush towers 12 each include a first portion 14 for matably receiving an end 11' of the beam 11 (welded or riveted in place), a second portion 15 configured for mounting to a vehicle frame rail for carrying the bumper beam 11, and a third portion 16 forming a front surface 17 extending from a face 18 of the end 15 of the beam 11. The third portion 16 is shaped to form a structural corner of the vehicle. As illustrated, the second and third portions 15 and 16 include undulated material sections formed by embossments 19 and 20, respectively, forming crush initiators for controlling transmission of impact energy from the beam 11 through the crush towers 12 to the vehicle frame rails. The crush initiators 19 and 20 are formed on the top and bottom walls (and potentially also on the vertical walls). Notably, the embossments 20 on the third portion 16 allow the part to be tuned for optimal corner impact characteristics. The crush towers 12 are preferably made from hot-stamped sheet material. Top and bottom halves (basically mirror images of each other) are stamped to a desired shape and include vertically-extending overlapping walls that fit matably together and that are welded (or otherwise secured) together to form each crush tower 12. For example, the top and bottom halves come together to define the opening for receiving the end 11' of the beam 11. Top and bottom material type and thickness can be different for tuning of the crush tower if desired, and further the components can be selectively annealed or heat treated. Attachment flanges can be integrally formed on the crush towers 12 for attachment to the vehicle frame rail, or alternatively a plate (see FIG. 1) or bracket can be welded to the crush towers 12 that includes holes for attachment to the vehicle frame rail.

A front of the third portion 16 forms an arcuate front surface defining a second radius smaller (i.e., more sharply radiused than) the arcuate surface of the beam 11. This allows the corners of a vehicle to have an increased curvature at ends of the beam 11, which is characteristic of (and a requirement from many OEMs in order to achieve) the aerodynamic shape of a front of many modern vehicles.

The present bumper system 10 allows for a material hybrid system, where materials are chosen for the beam 11 and crush towers 12 to create optimal impact and cost situations. For example, beam 11 can be aluminum, while the crush towers 12 can be stamped sheet metal. In such event, the beam-to-tower attachment could be rivets, for example.

The present construction of crush towers 12 allows the radii and shape of the outer face of the corner to be freely chosen. Further, the system can be tuned for optimal front impact characteristics by careful selection of materials or material thicknesses for the top and bottom halves of the crush towers 12. Further, the corner impact can be tuned in a similar way or by modifying the embossments forming the crush initiators, even late in the development program.

Advantageously, a tow hook mount 24 is integrally designed into the crush towers 12. Notably, the same crush tower 12 can be used regardless of whether a tow hook is a selected vehicle option or not. Also, mounting for sensors related to a tow hook or other bumper sensors or mounted components (such as lights, etc) can be integrally formed in the crush tower(s) 12.

Benefits of the present innovative design include the following. The design allows for the beam and mount combination to be made from a hybrid steel/aluminum combination of material. Radii at the bumper end are integrated in the stamping and can be freely chosen. The top and bottom material type and thickness can be different for tuning impact and functional characteristics. Rake requirements (sweep curvatures) can be designed into upper/lower stampings. The tow hook mounting can be part of a stamping process. The crush initiators can be stamped in for controlled crush behavior. The corner performance can be tuned. Also, the boss for mounting a tow hook sensor can be stamped in. The present parts provide particularly favorable impact strength and characteristics for a well-known 15% offset IIHS (Insurance Institute for Highway Safety) test. The top and bottom stamping integrate tight end radius and crush box into one stamping. Also, additional design choices are provided, for example, the section could be a rollformed "B" or "D" section welded to the crush boxes, or an aluminum extrusion beam riveted to the crush boxes.

It is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. A bumper system comprising: a longitudinally-curved bumper beam with arcuate front and rear surfaces extending end to end and defining a constant radius; and a pair of crush towers stamped from sheet metal, each said crush tower including a first portion defining an opening for matably receiving an end of the beam, a second portion configured for mounting to a vehicle frame rail for carrying the bumper beam, and a third portion forming a front surface extending from a face of the end of the bumper beam, at least one of the first, second, and third portions including crush initiators for controlling impact energy, wherein the crush towers each include an integrally formed forwardly-extending mount for a tow hook.

2. The bumper system defined in claim 1, wherein two of the first, second, and third portions include crush initiators for controlling impact energy.

3. The bumper system defined in claim 1, wherein a front surface of the third portion defines an arcuate shape when the crush tower is in a vehicle-mounted position.

4. The bumper system defined in claim 1, wherein the face of the beam includes a first front surface that defines a first curvilinear shape, and the third portion includes a second front surface extending from an outer end of the beam and that is more sharply curved to define a second shape different than the first curvilinear shape.

5. The bumper system defined in claim 1, wherein the face of the beam includes a first front surface that defines a first arcuate shape, and the third portion includes a second front surface that defines a second shape different than the first arcuate shape.

6. A bumper system comprising: a bumper beam; and a pair of crush towers, each said crush tower including a first portion for receiving an end of the beam, a second portion configured for mounting to a vehicle frame rail for carrying the bumper beam, and a third portion forming a front surface extending from a face of the end of the bumper, the third portion including a tow hook mount defined by a protruding section of material positioned outboard of the end of the beam and that protrudes forward from the front surface of the third portion.

7. The bumper system defined in claim 6, wherein the third portion is shaped to form a structural corner of the vehicle and to provide structure for corner impact strength.

8. A bumper system for a particular vehicle, comprising:
a longitudinally-curved bumper beam with a cross section defining at least one tubular section and a constant fore-aft dimension from end to end, the beam including an arcuate front surface defining a first radius; and
a pair of crush towers stamped from sheet metal, each said crush tower including an opening for receiving one of the beam ends, a mounting portion with flat end configured for attachment to a vehicle frame rail, a second front surface extending from the arcuate front surface but at a sharper radius to further match the aerodynamic shape of the vehicle outboard of the beam; at least a top wall of each of the crush towers including first parallel embossments on the mounting portion near to and extending parallel the flat end, and each further including second parallel embossments extending along and located near the second front surface.

* * * * *